United States Patent
Jerichow et al.

(10) Patent No.: US 11,889,304 B2
(45) Date of Patent: Jan. 30, 2024

(54) NEXT GENERATION KEY SET IDENTIFIER

(71) Applicant: NOKIA SOLUTIONS AND NETWORKS OY, Espoo (FI)

(72) Inventors: Anja Jerichow, Grafing (DE); Suresh Nair, Whippany, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 52 days.

(21) Appl. No.: 16/335,026

(22) PCT Filed: Sep. 20, 2016

(86) PCT No.: PCT/US2016/052682
§ 371 (c)(1),
(2) Date: Mar. 20, 2019

(87) PCT Pub. No.: WO2018/056957
PCT Pub. Date: Mar. 29, 2018

(65) Prior Publication Data
US 2019/0253888 A1    Aug. 15, 2019

(51) Int. Cl.
*H04L 9/08* (2006.01)
*H04W 12/00* (2021.01)
(Continued)

(52) U.S. Cl.
CPC ......... *H04W 12/041* (2021.01); *H04L 9/0844* (2013.01); *H04W 12/009* (2019.01);
(Continued)

(58) Field of Classification Search
CPC ............. H04W 12/0401; H04W 12/04; H04W 12/04031; H04W 12/009; H04W 12/06; H04L 9/0844
See application file for complete search history.

(56) References Cited

U.S. PATENT DOCUMENTS

2005/0273866 A1   12/2005 Brown et al.
2012/0263298 A1*  10/2012 Suh .................. H04W 4/60
                                              380/255

(Continued)

OTHER PUBLICATIONS

"3rd Generation Partnership Project; Technical Specification Group Services and System Aspects; Study on the security aspects of the next generation system (Release 14)", DRAFT_S3-161290-V1-33899-040_RM, 3rd Generation Partnership Project (3GPP), Mobile Competence Centre; 650, Route Des Lucioles; F-06921 Sophia-Antipolis Cedex; France, Aug. 9, 2016.

(Continued)

*Primary Examiner* — Michael Simitoski
*Assistant Examiner* — Andrew Suh
(74) *Attorney, Agent, or Firm* — ALSTON & BIRD LLP (57) ABSTRACT

Systems, methods, apparatuses, and computer program products directed to next generation (e.g., 5G systems) key set identifier(s) are provided. One method includes requesting, by a network node, authentication of a user equipment with an authentication server, receiving a master key and authentication parameters/vectors from the authentication server when authorization is successful, and verifying validity of the authentication request. When the verification is successful, the method may further include instantiating a security context for the user equipment and assigning a security context identifier for next generation system security context to the user equipment, and then sending a security mode command message to instruct the user equipment to instantiate security context using the security context identifier.

10 Claims, 4 Drawing Sheets

(51) Int. Cl.
   *H04W 12/06*     (2021.01)
   *H04W 12/041*    (2021.01)
   *H04W 12/04*     (2021.01)
   *H04W 12/71*     (2021.01)
   *H04W 12/0431*   (2021.01)
   *H04W 84/12*     (2009.01)

(52) U.S. Cl.
   CPC ....... *H04W 12/04* (2013.01); *H04W 12/0431* (2021.01); *H04W 12/06* (2013.01); *H04W 12/71* (2021.01); *H04W 84/12* (2013.01)

(56) References Cited

U.S. PATENT DOCUMENTS

| | | | |
|---|---|---|---|
| 2013/0269001 | A1 | 10/2013 | Janakiraman et al. |
| 2016/0127896 | A1 | 5/2016 | Lee et al. |
| 2016/0262015 | A1* | 9/2016 | Lee ........................ H04W 8/183 |
| 2016/0337898 | A1* | 11/2016 | Jeong .................. H04W 12/041 |
| 2017/0264439 | A1* | 9/2017 | Muhanna .................. H04L 9/14 |
| 2018/0206093 | A1* | 7/2018 | Jain ......................... H04W 4/70 |
| 2018/0376318 | A1* | 12/2018 | Wang ....................... H04W 4/70 |

OTHER PUBLICATIONS

Nokia: "Solution on 5G key identification", 3GPP Draft; S3-161393-V3 Solution on 5G Key Identification, 3rd Generation Partnership Project (3GPP), Mobile Competence Centre; 650, Route Des Lucioles; F-06921 Sophia-Antipolis Cedex; France, vol. SA WG3, No. San Diego, USA; Sep. 20, 2016.

"3rd Generation Partnership Project; Technical Specification Group Services and System Aspects; Study on the security aspects of the next generation system (Release 14)", DRAFT_S3-162138-V3-33899-060_RM, 3rd Generation Partnership Project (3GPP), Mobile Competence Centre; 650, Route Des Lucioles; F-06921 Sophia-Antipolis Cedex; France, Nov. 25, 2016.

Apr. 6, 2020 Extended Search Report issued in European Patent Application No. 16916929.9.

International Search Report and Written Opinion dated Jan. 26, 2017 corresponding to International Patent Application No. PCT/US2016/052682.

3rd Generation Partnership Project: Technical Specification Group; System Architecture Evolution (SAE); Security Architecture; "Digital Celluar Telecommunications System (Phase 2+)"; 3GPP TS 33.401 version 10.3.0 Release 10); Universal Mobile Telecommunications System (UMTS); LTE; Jul. 2012, 118 pages.

"3rd Generation Partnership Project; Technical Specification Group Services and System Aspects; Report on Alternative Architectures for combining CS Bearers with IMS; Release 6", 3GPP TR 23.899 v1.2.0 (Jun. 2005), 55 pages.

* cited by examiner

NEXT GENERATION KEY SET IDENTIFIER

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology. Some embodiments may generally relate to 5G security including, for example, managing and accessing the security context and the key hierarchy in 5G, and identifying the 5G security context and starting point of key derivation.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

$5^{th}$ generation wireless systems (5G) refers to the new generation of radio systems and network architecture. 5G is expected to provide higher bitrates and coverage than the current LTE systems. Some estimate that 5G will provide bitrates one hundred times higher than LTE offers. 5G is also expected to increase network expandability up to hundreds of thousands of connections. The signal technology of 5G is anticipated to be improved for greater coverage as well as spectral and signaling efficiency.

SUMMARY

One embodiment is directed to a method, which may include requesting, by a network node, authentication of a user equipment with an authentication server, receiving a master key and authentication parameters from the authentication server when authorization is successful, and verifying validity of the authentication request. The method may also include, when the verification is successful, instantiating a security context for the user equipment and assigning a security context identifier for next generation system security context to the user equipment, and sending a security mode command message to instruct the user equipment to instantiate security context using the security context identifier.

According to one embodiment, the network node may comprise a common control network function or security anchor function of a next generation (NG) communication system.

In an embodiment, the security context identifier may comprise a next generation key set identifier (NG-KSI). According to certain embodiments, the next generation key set identifier (NG-KSI) may comprise a parameter that is associated with the master key derived during the authentication and key agreement protocol and a security context established based on the master key.

In some embodiments, the security mode command message adapted for 5G comprises additional parameters to secure (next generation) non-access stratum (NAS) communication between the user equipment and the network node. According to one embodiment, the method may further include receiving an acceptance message from the user equipment indicating that the user equipment has instantiated a non-access stratum (NAS) security context using the next generation key set identifier (NG-KSI).

Another embodiment is directed to an apparatus including requesting means for requesting authentication of a user equipment with an authentication server, receiving means for receiving a master key and authentication parameters/vectors from the authentication server when authorization is successful, verifying means for verifying validity of authentication request, when the verification is successful, instantiating means for instantiating a security context for the user equipment and assigning a security context identifier for next generation system security context to the user equipment, and transmitting means for sending a security mode command message to instruct the user equipment to instantiate security context using the security context identifier.

According to one embodiment, the apparatus may comprise a common control network function or security anchor function of a next generation (NG) communication system.

In an embodiment, the security context identifier may comprise a next generation key set identifier (NG-KSI). According to certain embodiments, the next generation key set identifier (NG-KSI) may comprise a parameter that is associated with the master key derived during the authentication and key agreement protocol and a security context established based on the master key.

In some embodiments, the security mode command message adapted for 5G comprises additional parameters to secure (next generation) non-access stratum (NAS) communication between the user equipment and the network node. According to one embodiment, the apparatus may further include receiving means for receiving an acceptance message from the user equipment indicating that the user equipment has instantiated a non-access stratum (NAS) security context using the next generation key set identifier (NG-KSI).

Another embodiment is directed to an apparatus, which may include at least one processor and at least one memory including computer program code. The at least one memory and computer program code are configured, with the at least one processor, to cause the apparatus at least to request authentication of a user equipment with an authentication server, receive a master key and authentication parameters or vectors from the authentication server when authorization is successful, verify validity of the authentication request, when the verification is successful, instantiate a security context for the user equipment and assign a security context identifier for next generation system security context to the user equipment, and send a security mode command message to instruct the user equipment to instantiate security context using the security context identifier.

Another embodiment is directed to a method, which may include after authentication verification of a user equipment, receiving a security mode command message from a network node. The security mode command message comprises instructions to instantiate a non-access stratum (NAS) security context and comprises a security context identifier for next generation system security context. The method may also include instantiating a non-access stratum (NAS) security context using the security context identifier as a security index.

According to an embodiment, the network node may comprise a common control network function or security anchor function of a next generation communication system.

In an embodiment, the security context identifier may comprise a next generation key set identifier (NG-KSI). According to certain embodiments, the next generation key set identifier (NG-KSI) may comprise an assigned index value and a type of security context parameter indicating whether a next generation security context is a native next generation security context derived out of next generation authentication of the user equipment or a mapped next generation security context derived out of a non-next generation authentication of the user equipment.

According to one embodiment, the security mode command message comprises additional parameters to secure (next generation) non-access stratum (NAS) communication between the user equipment and the network node. In an embodiment, the method may further include sending an acceptance message to the network node indicating that the user equipment has instantiated a non-access stratum (NAS) security context using the next generation key set identifier (NG-KSI).

Another embodiment is directed to an apparatus that includes, after authentication verification of the apparatus, receiving means for receiving a security mode command message from a network node. The security mode command message comprises instructions to instantiate a non-access stratum (NAS) security context and comprises a security context identifier for next generation system security context. The apparatus may also include instantiating means for instantiating a non-access stratum (NAS) security context using the security context identifier as a security index.

In certain embodiments, the apparatus may be a user equipment. According to one embodiment, the network node may comprise a common control network function or security anchor function of a next generation communication system.

In an embodiment, the security context identifier may comprise a next generation key set identifier (NG-KSI). According to one embodiment, the next generation key set identifier (NG-KSI) may comprise an assigned index value and a type of security context parameter indicating whether a next generation security context is a native next generation security context derived out of next generation authentication of the apparatus or a mapped next generation security context derived out of a non-next generation authentication of the apparatus.

According to certain embodiments, the security mode command message may comprise additional parameters to secure non-access stratum (NAS) communication between the apparatus and the network node. In one embodiment, the apparatus may further include transmitting means for sending an acceptance message to the network node indicating that the apparatus has instantiated a non-access stratum (NAS) security context using the next generation key set identifier (NG-KSI).

Another embodiment is directed to an apparatus comprising at least one processor and at least one memory including computer program code. The at least one memory and computer program code are configured, with the at least one processor, to cause the apparatus at least to, after authentication verification of the apparatus, receive a security mode command message from a network node. The security mode command message comprises instructions to instantiate a non-access stratum (NAS) security context and comprises a security context identifier for next generation system security context. The at least one memory and computer program code are further configured, with the at least one processor, to cause the apparatus at least to instantiate a non-access stratum (NAS) security context using the security context identifier as a security index.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products directed to next generation (e.g., 5G) key set identifier(s), as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

The next generation 5G system is being designed, and will require backward compatibility to LTE and other systems. For this purpose, a clear identification of the used key sets is needed. For managing and accessing the security context and the key hierarchy in 5G and to identify the 5G security context and starting point of key derivation, a new parameter will be needed which is associated with a master key derived during the 5G authentication and key agreement protocol and the security context established based on this key in the 5G system. It should be noted that, as described herein, a next generation (NG) system may refer to a 5G system or other next generation (i.e., post-LTE) communications system.

The evolved packet core (EPC) key identifier for $K_{ASME}$ is called key set identifier eKSI which can be of type $KSI_{ASME}$ or of type $KSI_{SGSN}$. The eKSI is stored in the UE and the mobility management entity (MME) together with $K_{ASME}$ and the globally unique temporary identifier (GUTI), if available.

As further detailed in 3GPP technical specification (TS) 33.401: "The key set identifier $KSI_{ASME}$ is a parameter which is associated with the $K_{ASME}$ derived during EPS AKA authentication. The key set identifier $KSI_{ASME}$ is allocated by the MME and sent with the authentication request message to the mobile station where it is stored together with the $K_{ASME}$. The purpose of the $KSI_{ASME}$ is to make it possible for the UE and the MME to identify a native $K_{ASME}$ without invoking the authentication procedure. This is used to allow re-use of the $K_{ASME}$ during subsequent connection set-ups. The key set identifier $KSI_{SGSN}$ is a parameter which is associated with the mapped $K_{ASME}$ derived from UMTS keys during inter-RAT mobility, cf. clauses 9 and 10 of the present specification. The key set identifier $KSI_{SGSN}$ is generated in both the UE and the MME respectively when deriving the mapped $K_{ASME}$ during idle procedures in E-UTRAN and during handover from GERAN/UTRAN to E-UTRAN. The $KSI_{SGSN}$ is stored together with the mapped $K_{ASME}$. The purpose of the $KSI_{SGSN}$ is to make it possible for the UE and the MME to indicate the use of the mapped $K_{ASME}$ in inter-RAT mobility procedures."

Therefore, as mentioned above, in order to manage and access the security context and the key hierarchy in 5G and to identify the 5G security context and starting point of key derivation, a new parameter will be needed which is associated with a master key derived during the 5G authentication and key agreement protocol and the security context established based on this key in the 5G system.

The next generation 5G system is expected to have one key set identifier to manage and access the security context and key hierarchy in 5G. The key set identifier should be integrity and confidentiality protected while it is transmitted between the NG-UE and the NG system.

According to an embodiment of the invention, a Next Generation Key Set Identifier (NG-KSI) is provided as a parameter that is associated with a master key derived during an authentication and key agreement protocol and the security context established based on this key in the 5G system. In one embodiment, from the master key, a set of keys may be derived for securing non-access stratum (NAS) control plane signaling as well as user plane data terminated directly on the user plane gateway (UPGW). Subsequent to the successful authentication of the UE and the master key (e.g., similar to K_ASME), keys to protect the access stratum (AS) may be derived. Since the 5G system is being designed to have a unified authentication framework to support multiple access technologies such as 5G(NR), LTE, trusted non-3GPP access, trusted 3GPP access, etc., keys need to be derived to support access from any of these access technologies.

Figure 1:
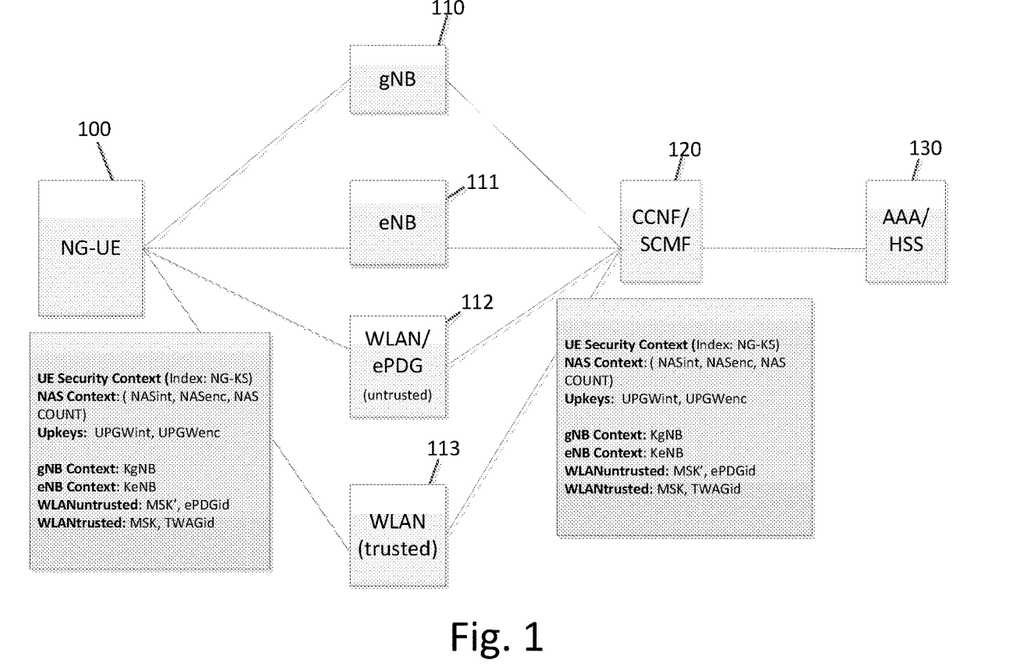
FIG. 1 illustrates a block diagram of a system, according to one embodiment.

FIG. 1 illustrates a block diagram of an example system using the key set and security context required in 5G, according to an embodiment. More specifically, FIG. 1 illustrates an example of the 5G security context at new generation UE (NG-UE) 100 and common control network function (CCNF)/SCMF 120 with index NG-KSI to support a unified UE authentication and security context management across multiple access technologies. In the example of FIG. 1, NG-UE 100 may be capable of communication with one or more of a gNB 110, an eNB 111, WLAN/ePDG 112, and/or WLAN 113. The CCNF/SCMF 120 may be in communication with or coupled to an AAA/HSS 130. The Security Context Management Function (SCMF) refers to an element in the core network that, upon successful UE authentication, can maintain an authentication security context from which the security contexts for the specific functionality as applicable for the CN and the specific AN will be derived.

According to an embodiment, the key set identifier (NG-KSI) may be stored in the dedicated network entity initiating authentication and key agreement (AKA) in 5G. For example, the key set identifier (NG-KSI) may be stored in the CCNF or in a mobility management function (MMF) entity. At the end of successful authentication and verification of the UE, the NG-KSI may be assigned and sent by the CCNF to the UE instructing it to begin a NAS context with index NG-KSI.

It should be noted that, although certain embodiments are applicable to 5G systems, some embodiments described herein may refer to network elements and protocols using 4G/LTE terminology. This is because 5G terminology has not yet been fixed. Therefore, embodiments of the invention may be applicable to network elements or protocols with different names or terminology than used herein.

Figure 2:
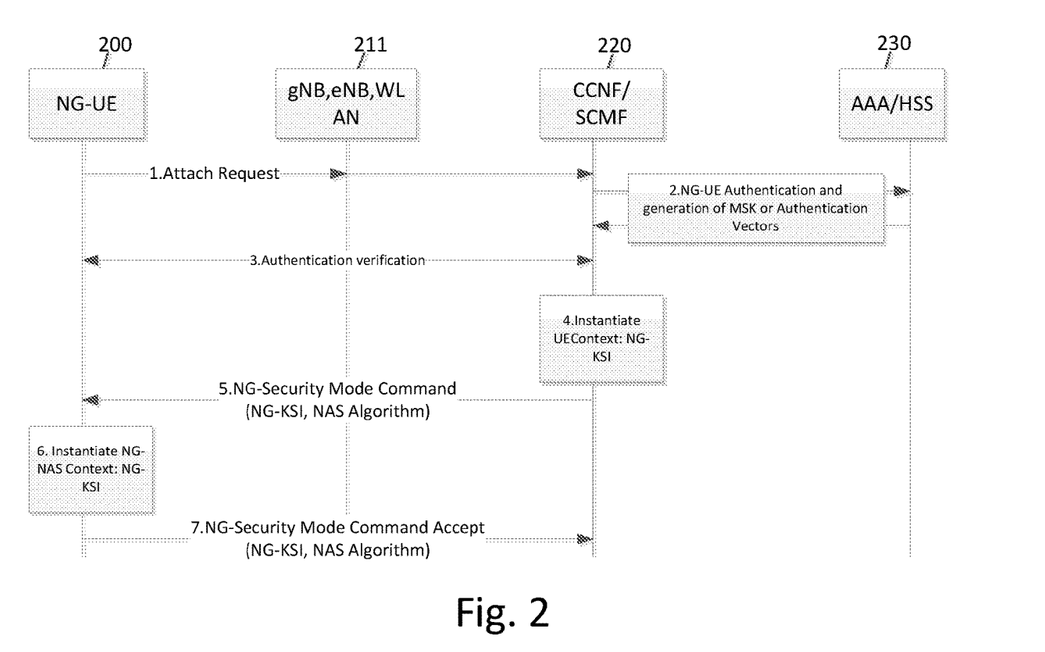
FIG. 2 illustrates a signaling flow diagram, according to an embodiment.

FIG. 2 illustrates an example of a signaling flow diagram depicting an example of a process, according to one embodiment. More specifically, FIG. 2 depicts a UE Authentication and Security context instantiation process with NG-KSI assignment, according to an embodiment. As illustrated in FIG. 2, at step 1, the next generation UE 200, transmits an Attach Request to the NG system, for example, to a gNB, eNB, WLAN 211. The Attach Request can be made through any of the radio access technologies supported in the 5G system. At step 2, the Common Control Network Function (CCNF) or the Security Anchor Function (SEAF) 220 requests UE authentication with an authentication, authorization and accounting (AAA) or home subscriber server (HSS) 230, and requests Master key and Authentication vectors. If authentication is successful, then the keys are received at the CCNF/SEAF 220.

Continuing with FIG. 2, at step 3, if authentication verification has been successful by CCNF/SEAF 220, then, at step 4, the CCNF/SEAF 220 instantiates a security context for the UE 200. In an embodiment, the CCNF/SEAF 220 assigns a security context identifier, NG-KSI, for the NG system security context. The NG-KSI helps the UE 200 and the NG system (e.g., network nodes 211) to correctly identify the security context during mobility events. At step 5, the CCNF/SEAF 220 sends a NAS security mode command message to instruct the UE 200 (e.g., a NG-UE) to instantiate the NAS security context (e.g., a NAS security context) and the NG-KSI. The security mode command message may contain additional parameters to secure the NAS communication between the UE 200 and CCNF/SEAF 220, such as selected algorithms, NAS counters, etc. At step 6, when the UE 200 receives the NAS security mode command, the UE 200 instantiates the NAS security context with NG-KSI as the index. Then, at step 7, the UE 200 sends a NAS security mode command acceptance message to convey to the CCNF/SEAF 220 that it has instantiated the NAS security context.

According to certain embodiments, the NG-KSI allows the UE and the CCNF/MMF to identify the security context and the correct master key. If such a parameter is used, then the UE and the dedicated network entity storing the NG-KSI do not need to invoke the authentication procedure during a subsequent set-up of the connection during mobility events from LTE to NG system or when a connection is changed from one access technology to another within the 5G system.

Figure 3:
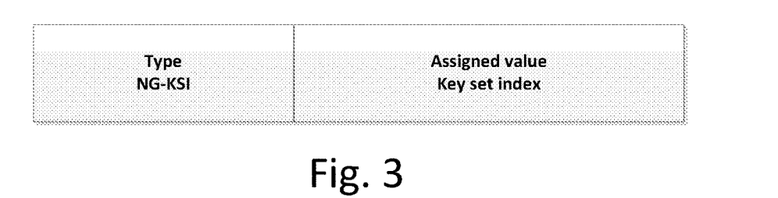
FIG. 3 illustrates an example of a structure of a security context identifier, according to one embodiment.

The NG-KSI may be comprised of a value and a type of security context parameter indicating whether an NG security context is a native NG security context derived out of NG authentication of the UE or a mapped NG security context derived out of LTE (or other non-NG radio access technology) authentication of the UE. FIG. 3 illustrates an example structure of a NG-KSI, according to one embodiment. As illustrated in FIG. 3, a NG-KSI may include at least two fields: a type as NG-KSI field and an assigned value of the index field.

For interworking purposes, the UE and the CCNF/MMF both need a storage area for several key set identifiers in their distinguished systems. According to an embodiment, they are linked to NG-KSI, e.g., eKSI (4G), by UE and CCNF/MMF as shown in FIG. 1 discussed above. According to an embodiment, the NG-KSI is a part of new security messages exchanged between the 5G or NG system and a NG UE.

Figure 4A:
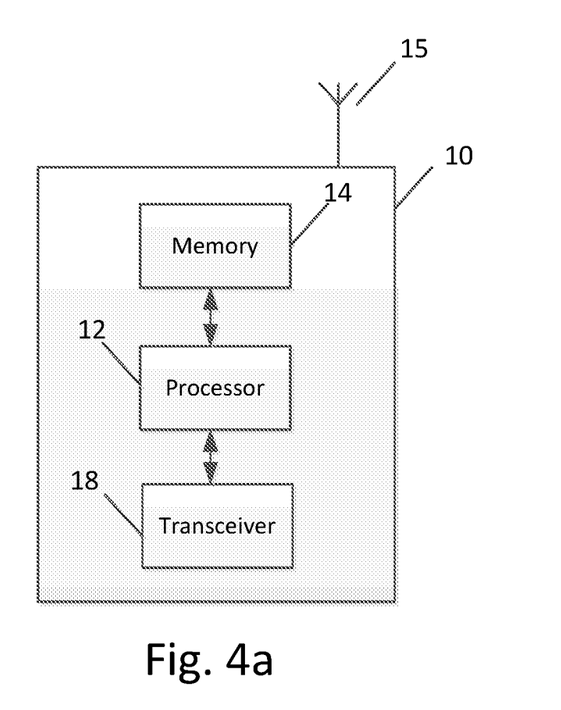
FIG. 4a illustrates a block diagram of an apparatus, according to one embodiment.

FIG. 4a illustrates an example of an apparatus 10 according to an embodiment. In an embodiment, apparatus 10 may be a node, host, or server in a communications network or serving such a network. For example, apparatus 10 may be a base station, an evolved node B, WLAN access point, subscription server (e.g., HSS), authentication server (e.g., AAA), CCNF, SCMF, or SEAF associated with a radio access network, such as a LTE network or 5G radio access technology. It should be noted that one of ordinary skill in the art would understand that apparatus 10 may include components or features not shown in FIG. 4a.

As illustrated in FIG. 4a, apparatus 10 may include a processor 12 for processing information and executing instructions or operations. Processor 12 may be any type of general or specific purpose processor. While a single processor 12 is shown in FIG. 4a, multiple processors may be utilized according to other embodiments. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 12, enable the apparatus 10 to perform tasks as described herein.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of LTE, 5G, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a next generation (e.g., 5G) network node or server, such as a CCNF or SEAF, for example. According to one embodiment, apparatus 10 may be controlled by memory 14 and processor 12 to request authentication of a user equipment with an authentication or subscription server (e.g., AAA or HSS). In an embodiment, when authentication is successful, apparatus 10 may be further controlled by memory 14 and processor 12 to receive a master key and authentication parameters or vectors from the authentication/subscription server. Apparatus 10 may then be controlled by memory 14 and processor 12 to verify the validity of the authentication request and/or to verify the validity of the user equipment and authentication parameters. For example, the validity of the authentication request may be verified using the received authentication parameters in order to authenticate the user equipment for service in a next generation communications system. If the verification is successful, apparatus 10 may be controlled by memory 14 and processor 12 to instantiate a security context for the user equipment and assign a security context identifier for next generation system security context to the user equipment. In one embodiment, the assigned security context identifier is a NG-KSI. Apparatus 10 may then be controlled by memory 14 and processor 12 to send a security mode command message to instruct the user equipment to instantiate a security context using the security context identifier (e.g., NG-KSI).

In one embodiment, the NG-KSI may include a parameter that is associated with the master key derived during the authentication and key agreement protocol and a security context established based on the master key. According to certain embodiments, the NG-KSI may include a value and a type of security context parameter indicating whether a next generation security context is a native next generation security context derived out of next generation authentication of the user equipment or a mapped next generation security context derived out of a non-next generation (e.g., LTE) authentication of the user equipment.

According to some embodiments, the security mode command message sent to the user equipment may include, in addition to the NG-KSI, other parameters to secure NAS (e.g., NG-NAS) communication between the user equipment and the apparatus 10. In an embodiment, apparatus 10 may be controlled by memory 14 and processor 12 to receive an acceptance message from the user equipment indicating that the user equipment has instantiated a NAS security context using the NG-KSI.

Figure 4B:
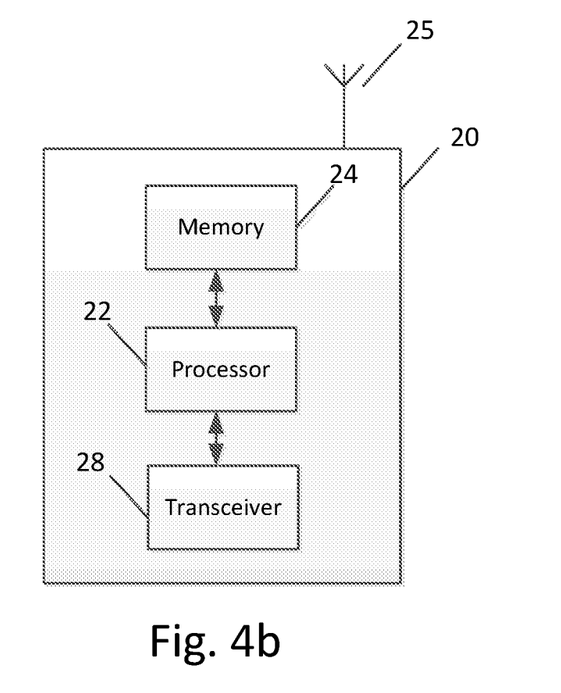
FIG. 4b illustrates a block diagram of an apparatus, according to another embodiment.

FIG. 4b illustrates an example of an apparatus 20 according to another embodiment. In an embodiment, apparatus 20 may be a node or element in a communications network or associated with such a network, such as a UE, mobile equipment (ME), mobile device, stationary device, or other device. As described herein, UE may alternatively be referred to as, for example, a mobile station, mobile equipment, mobile unit, mobile device, user device, subscriber station, wireless terminal, tablet, smart phone, or the like. Apparatus 20 may be implemented in, for example, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as LTE, LTE-A, 5G, WLAN, WiFi, Bluetooth, NFC, and any other radio access technologies. It should be noted that one of ordinary skill in the art would understand that apparatus 20 may include components or features not shown in FIG. 4b.

As illustrated in FIG. 4b, apparatus 20 may include or be coupled to a processor 22 for processing information and executing instructions or operations. Processor 22 may be any type of general or specific purpose processor. While a single processor 22 is shown in FIG. 4b, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In some embodiments, apparatus 20 may also include or be coupled to one or more antennas 25 for receiving a downlink or signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of LTE, LTE-A, 5G, WLAN, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a mobile device, UE, or ME, for example. In this embodiment, apparatus 20 may be controlled by memory 24 and processor 22 to perform the functions associated with embodiments described herein. In one embodiment, apparatus 20 may be controlled by memory 24 and processor 22 to perform or transmit an attach request message to a (NG/5G) network node. After authentication verification of the apparatus 20 by the network node, apparatus 20 may be controlled by memory 24 and processor 22 to receive a security mode command message from the network node (e.g., CCNF/SEAF). The security mode command message may include instructions to instantiate a NAS security context (e.g., a NG-NAS security context) and may also include a security context identifier for next generation system security context. In an embodiment, the security context identifier is a NG-KSI.

Apparatus 20 may then be controlled by memory 24 and processor 22 to instantiate NAS security context (e.g., a NG-NAS security context) using the security context identifier as a security index. The security mode command message may also include additional parameters to secure NAS communication between the apparatus 20 and the network node.

According to one embodiment, the NG-KSI includes a value and a type of security context parameter indicating whether a next generation security context is a native next generation security context derived out of next generation authentication of the apparatus 20 or a mapped next generation security context derived out of a non-next generation (e.g., LTE) authentication of the apparatus 20.

In one embodiment, apparatus 20 may be further controlled by memory 24 and processor 22 to send an acceptance message to the network node indicating that the apparatus 20 has instantiated a NAS security context using the NG-KSI.

Figure 5A:
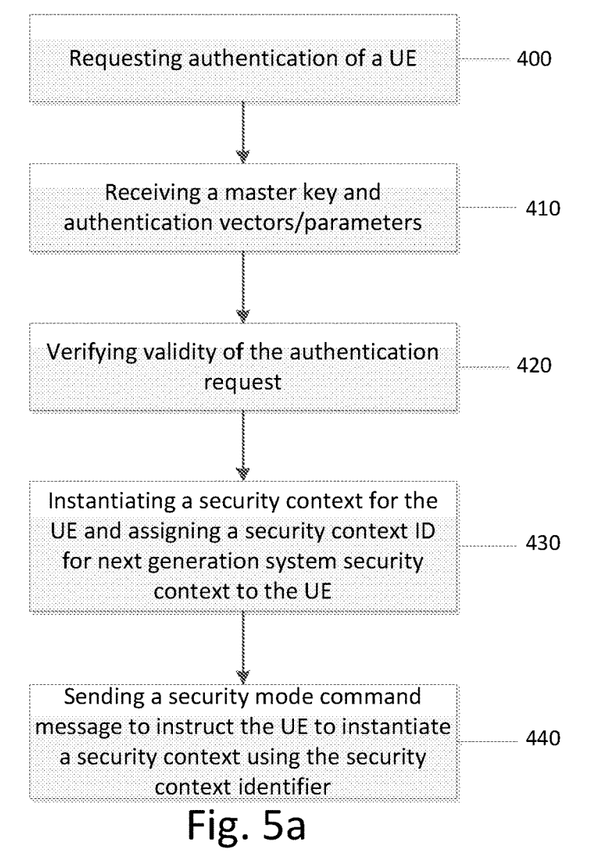
FIG. 5a illustrates a flow diagram of a method, according to one embodiment.

FIG. 5a illustrates a flow diagram of a method, according to one embodiment. In certain embodiments, the method of FIG. 5a may be performed by an access node or control node of a next generation or 5G communication systems. For example, in some embodiments, the method of FIG. 5a may be performed by a CCNF or SEAF. As illustrated in FIG. 5a, the method may include, at 400, requesting authentication of a user equipment with an authentication or subscription server (e.g., AAA or HSS). In an embodiment, when authorization is successful, the method may include, at 410, receiving a master key and authentication parameters or vectors from the authentication/subscription server.

The method of FIG. 5a may then include, at 420, verifying the validity of the authentication request and/or verifying the validity of the user equipment and authentication parameters. For example, the validity of the authentication request may be verified using the received authentication parameters in order to authenticate the user equipment for service in a next generation communications system. If the verification is successful, the method may include, at 430, instantiating a security context for the user equipment and assigning a security context identifier for next generation system security context to the user equipment. In one embodiment, the assigned security context identifier is a NG-KSI. The method may then include, at 440, sending a security mode command message to instruct the user equipment to instantiate a security context using the security context identifier (e.g., NG-KSI).

According to some embodiments, the sending of the security mode command message to the user equipment may further include sending, in addition to the NG-KSI, other parameters to secure NAS communication between the user equipment and the access/control node of the next generation system. In an embodiment, the method may also include receiving an acceptance message from the user equipment indicating that the user equipment has instantiated a NAS security context using the NG-KSI.

Figure 5B:
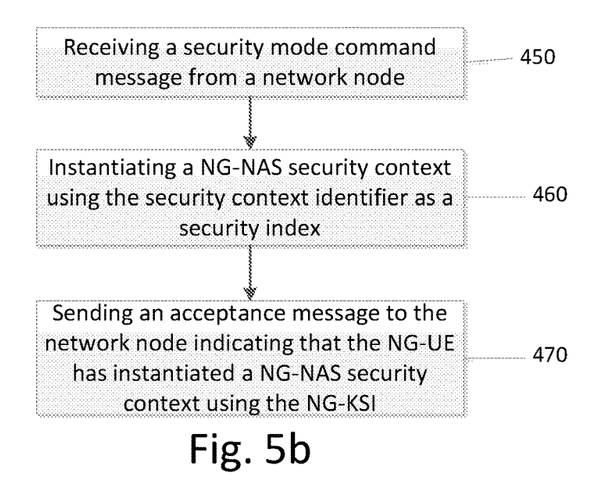
FIG. 5b illustrates a flow diagram of a method, according to another embodiment.

FIG. 5b illustrates a flow diagram of a method, according to another embodiment. In certain embodiments, the method of FIG. 5b may be performed by a mobile device, UE, or ME, for example. As illustrated in FIG. 5b, the method may include, at 450, after authentication verification of the UE by the network, receiving a security mode command message from a network node (e.g., CCNF/SEAF). The security mode command message may include instructions to instantiate a NAS security context and may also include a security context identifier for next generation system security context. In an embodiment, the security context identifier is a NG-KSI. The security mode command message may also include additional parameters to secure non-access stratum (NAS) communication between the UE and the network.

In an embodiment, the method of FIG. 5b may further include, at 460, instantiating a non-access stratum (NAS) security context using the security context identifier as a security index. According to one embodiment, the method may also include, at 470, sending an acceptance message to the network node indicating that the UE has instantiated a NAS security context using the NG-KSI.

Embodiments of the invention provide several advantages and/or technical improvements. Embodiments of the invention can improve the performance and security of wireless communications networks and their nodes. As a result, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor. In some embodiments, the apparatus may be, included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method comprising:
requesting, by a security anchor function or a common control network function, authentication of a user equipment with an authentication server;
in an instance in which the authentication by the authentication server is successful, receiving, at the security anchor function or the common control network function, during an authentication and key agreement protocol, from the authentication server, authentication vectors comprising a particular master key from among a plurality of master keys and authentication parameters;
storing, at the security anchor function or the common control network function, the particular master key and the authentication parameters;
verifying, at the security anchor function or the common control network function, validity of the authentication parameters;
in an instance in which the verification has been successful, instantiating, by the security anchor function or the common control network function, a security context for the user equipment and assigning a security context identifier for next generation system security context to the user equipment;
sending, from the security anchor function or the common control network function, to the user equipment, a security mode command message to instruct the user equipment to instantiate a non-access stratum (NAS) security context using the security context identifier,
wherein the security context identifier comprises a next generation key set identifier (NG-KSI) that is usable by the user equipment and the security anchor function or the common control network function to identify the NAS security context during mobility events without the security anchor function or the common control network function providing the authentication parameters to the user equipment, and
wherein the NG-KSI comprises a first field indicating an assigned index value and a second field indicating a type of security context parameter, wherein the second field further indicates whether a next generation security context is a native next generation security context derived out of next generation authentication of the user equipment or a mapped next generation security context derived out of a non-next generation authentication of the user equipment; and
receiving, at the security anchor function or the common control network function, from the user equipment, in response to the security mode command message, a security mode command acceptance message indicating that the user equipment has instantiated the NAS security context using the NG-KSI.

2. The method according to claim 1, wherein the security mode command message is adapted for fifth-generation (5G) communication systems, wherein the security mode command message comprises additional parameters to facilitate instantiation of the secure NAS communication between the user equipment and the security anchor function or the common control network function.

3. An apparatus comprising:
at least one processor; and
at least one memory storing instructions that, when executed by the at least one processor, cause the apparatus to perform at least:
requesting authentication of a user equipment with an authentication server;
in an instance in which the authentication by the authentication server is successful, receiving, during an authentication and key agreement protocol, from the authentication server, authentication vectors comprising a particular master key from among a plurality of master keys and authentication parameters;
storing the particular master key and the authentication parameters at the apparatus;
verifying validity of authentication parameters/vectors;
in an instance in which the verification has been successful, instantiating a security context for the user equipment and assigning a security context identifier for next generation system security context to the user equipment;

sending, to the user equipment, a security mode command message to instruct the user equipment to instantiate a Non-Access Stratum (NAS) security context using the security context identifier, wherein the security context identifier comprises a next generation key set identifier (NG-KSI) that is usable by the user equipment and the apparatus to identify the NAS security context during mobility events without the apparatus providing the authentication parameters to the user equipment, and wherein the NG-KSI comprises a first field indicating an assigned index value and a second field indicating a type of security context parameter, wherein the second field further indicates whether a next generation security context is a native next generation security context derived out of next generation authentication of the user equipment or a mapped next generation security context derived out of a non-next generation authentication of the user equipment; and receiving, from the user equipment, in response to the security mode command message, a security mode command acceptance message indicating that the user equipment has instantiated the NAS security context using the NG-KSI.

4. The apparatus according to claim 3, wherein the security mode command message comprises additional parameters to secure NAS communication between the user equipment and the apparatus.

5. The apparatus according to claim 3, wherein the apparatus comprises a common control network function or a security anchor function of a next generation communication system.

6. A method comprising:

sending, from a user equipment, to an access node of a communication system, an attach request;

after authentication verification of the user equipment at an authentication server of the communication system, receiving, at the user equipment, from a security anchor function or a common control network function of the communication system, via the access node, a security mode command message, wherein the security mode command message comprises a security context identifier for a next generation system security context;

instantiating, at the user equipment, a non-access stratum (NAS) security context using the security context identifier; and sending, from the user equipment, to the access node, a security mode command acceptance message indicating that the user equipment has instantiated the NAS security context using the security context identifier, herein the security context identifier comprises a next generation key set identifier (NG-KSI) that is usable by the user equipment and the security anchor function or the common control network function to identify the NAS security context during mobility events without the user equipment receiving authentication parameters from the security anchor function or the common control network function, and wherein the NG-KSI comprises a first field indicating an assigned index value and a second field indicating a type of security context parameter, wherein the second field further indicates whether a next generation security context is a native next generation security context derived out of next generation authentication of the user equipment or a mapped next generation security context derived out of a non-next generation authentication of the user equipment.

7. The method according to claim 6, wherein the security mode command message comprises additional parameters to secure NAS communication between the user equipment and the security anchor function or the common control network function.

8. An apparatus comprising:

at least one processor; and at least one memory storing instructions that, when executed by the at least one processor, cause the apparatus to perform at least:

sending, to an access node of a communication system, an attach request;

after authentication verification of the apparatus at an authentication server of the communication system based on said attach request, receiving, from a security anchor function or a common control network function of the communication system, via the access node, a security mode command message, wherein the security mode command message comprises a security context identifier for a next generation system security context;

instantiating a non-access stratum (NAS) security context using the security context identifier; and sending, to the access node, a security mode command acceptance message indicating that the apparatus has instantiated the NAS security context using the security context identifier, wherein the security context identifier comprises a next generation key set identifier (NG-KSI) that is usable by the apparatus and the security anchor function or the common control network function to identify the NAS security context during mobility events without the apparatus receiving authentication parameters from the security anchor function or the common control network function, and wherein the NG-KSI comprises a first field indicating an assigned index value and a second field indicating a type of security context parameter, wherein the second field further indicates whether a next generation security context is a native next generation security context derived out of next generation authentication of the apparatus or a mapped next generation security context derived out of a non-next generation authentication of the apparatus.

9. The apparatus according to claim 8, wherein the security mode command message comprises additional parameters to secure NAS communication between the apparatus and the security anchor function or the common control network function.

10. The apparatus according to claim 8, wherein the apparatus comprises a user equipment.

* * * * *

UNITED STATES PATENT AND TRADEMARK OFFICE
CERTIFICATE OF CORRECTION

PATENT NO. : 11,889,304 B2
APPLICATION NO. : 16/335026
DATED : January 30, 2024
INVENTOR(S) : Anja Jerichow et al.

It is certified that error appears in the above-identified patent and that said Letters Patent is hereby corrected as shown below:

In the Claims

In Column 15, Line 55, Claim 6, delete "herein" and insert -- wherein --, therefor.

Signed and Sealed this
First Day of October, 2024

Katherine Kelly Vidal
*Director of the United States Patent and Trademark Office*